United States Patent [19]

Sutoh et al.

[11] 4,424,933

[45] Jan. 10, 1984

[54] VEHICLE HUMIDITY CONTROL APPARATUS FOR PREVENTING FOGGING OF WINDOWS

[75] Inventors: Shinji Sutoh; Seizi Sumikawa; Shinichi Kaneko, all of Konan; Toshizo Hara, Higashi Matsuyama, all of Japan

[73] Assignee: Diesel Kiki Company, Ltd., Tokyo, Japan

[21] Appl. No.: 198,430

[22] Filed: Oct. 20, 1980

[30] Foreign Application Priority Data

Oct. 20, 1979 [JP] Japan .................................. 54-135536

[51] Int. Cl.³ .......................................... G05D 21/00
[52] U.S. Cl. .................................... 236/44 A; 165/21
[58] Field of Search ................. 165/17, 21, 20, 41–43; 236/44 R, 44 A, 44 C, 91 C; 62/176 R, 176 A, 176 E, 176 C, 128, 150, 248; 98/2.01, 2.08, 2.09, 2.11, 90, 92; 52/171; 219/203

[56] References Cited

U.S. PATENT DOCUMENTS

| | | | |
|---|---|---|---|
| 2,059,846 | 11/1936 | Bulger | 236/44 C |
| 2,286,551 | 6/1942 | Kingsland | 236/44 C |
| 2,979,265 | 4/1961 | Stock | 236/44 C |
| 3,864,659 | 2/1975 | Furuuchi et al. | 219/203 |

*Primary Examiner*—William E. Wayner
*Assistant Examiner*—Harry Tanner
*Attorney, Agent, or Firm*—David G. Alexander

[57] ABSTRACT

A sensor (24) is provided to sense the humidity at the inner surface of a window of a vehicle interior. When the sensed surface humidity is above a certain value, the possibility of the window being fogged arises and a humidifier (28) is de-energized. The humidifier (28) is normally operated to increase the interior humidity to within a desirable range. When the surface humidity is above a higher value, the air interior air control system is operated to reduce the interior humidity by turning on a defroster or the like in accordance with the outside air temperature.

3 Claims, 7 Drawing Figures

VEHICLE HUMIDITY CONTROL APPARATUS FOR PREVENTING FOGGING OF WINDOWS

BACKGROUND OF THE INVENTION

The present invention relates to a vehicle humidity control apparatus comprising means for preventing the fogging or dimming of vehicle windows due to condensation of moisture on the window inner surfaces. Such fogging impairs the visibility of the vehicle operator and creates a potentially dangerous situation.

In the art developed thus far, the operator must manually control the various components of an interior air control system such as a heater, blower, cooler, defroster and the like to eliminate the fogging as it starts to occur. Such manual operation detracts from the ability of the operator to concentrate on road conditions which further invites the possibility of a tragic accident. When it starts to rain, the interior humidity increases and together therewith the tendency of the windows to fog. Such a condition is especially disadvantageous since the visibility is already reduced by the rain and the operator must control the windshield wipers along with taking measures to prevent fogging of the windows while continuing to drive the vehicle.

It has become popular recently to provide humidifiers in vehicles to prevent dehydration of the occupants and subsequent discomfort. However, when the windows begin to fog, the operator is confronted with yet another manual operation of turning off the humidifier. In summary, all of these manual operations for coping with rain and fogging of the vehicle windows are a nuisance and a potential safety hazzard.

SUMMARY OF THE INVENTION

It is an object of the present invention to provide a humidity control apparatus for a vehicle interior comprising means for automatically controlling the interior humidity in such a manner as to prevent fogging of the vehicle windows due to condensation of moisture thereon caused by excess humidity and temperature differentials.

A vehicle interior humidity control apparatus embodying the present invention includes interior humidity sensor means for sensing an interior humidity, window inner surface humidity sensor means for sensing a window inner surface humidity and interior humidifying means, and is characterized by comprising system control means responsive to outputs of the interior humidity sensor means and inner surface humidity sensor means for controlling the humidifying means in such a manner that when the inner surface humidity is below a low predetermined value the humidifying means is operated to increase the interior humidity to within a predetermined range and when the inner surface humidity is above the low predetermined value the humidifying means is de-energized.

In accordance with the present invention, a sensor is provided to sense the humidity at the inner surface of a window of a vehicle interior. When the sensed surface humidity is above a certain value, the possibility of the window being fogged arises and a humidifier is de-energized. The humidifier is normally operated to increase the interior humidity to within a desirable range. When the surface humidity is above a higher value, the interior air control system is operated to reduce the interior humidity by turning on a defroster or the like in accordance with the outside air temperature.

It is another object of the present invention to provide a generally improved vehicle humidity control apparatus.

Other objects, together with the foregoing, are attained in the embodiments described in the following description and illustrated in the accompanying drawing.

DESCRIPTION OF THE PREFERRED EMBODIMENTS

While the vehicle humidity control apparatus of the present invention is susceptible of numerous physical embodiments, depending upon the environment and requirements of use, substantial numbers of the herein shown and described embodiments have been made, tested and used, and all have performed in an eminently satisfactory manner.

Figure 1:
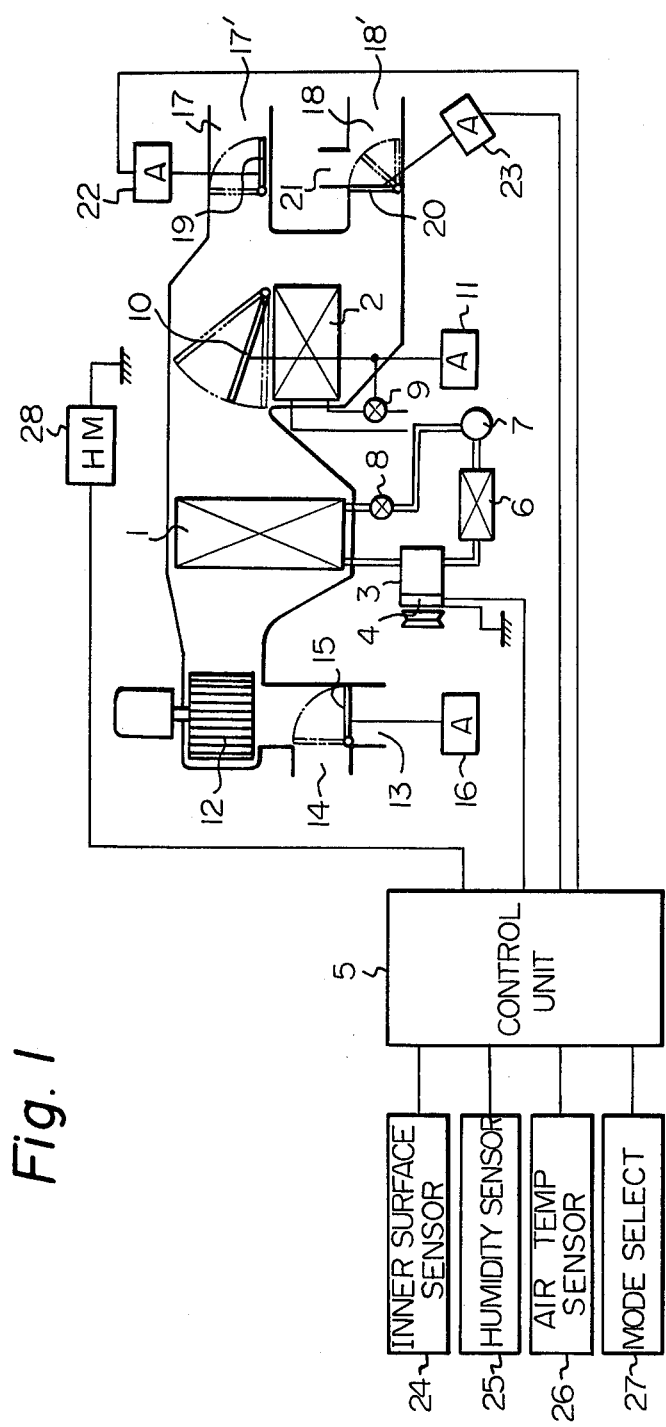
FIG. 1 schematically illustrates an automotive air conditioning system to which the present invention is applied.

Referring to FIG. 1, there is shown an automotive air conditioning system of the so-called air mix type. The air conditioning system includes an evaporator 1 and a heater core 2 located in the system downstream of the evaporator 1. The evaporator 1 is adapted to cool air coming into the system and forms a closed loop fluid circuit together with a compressor 3, condenser 6, liquid receiver 7 and expansion valve 8. The evaporator 1 is driven by an electromagnetic clutch 4 which is in turn coupled and uncoupled by outputs of a control circuit or unit 5.

Adapted to heat incoming air, the heater core 2 is supplied with a controlled volume of hot engine coolant through a water cock 9 which is opened and closed also by the control circuit 5. In the illustrated embodiment, an actuator 11 associated with an air mix door 10 bifunctions to control the position of the water cock 9.

As shown, the air mix door 10 is positioned on the upstream side of the heater core 2 such that it suitably proportions the cooled and heated air and thereby the temperature of the inlet air in accordance with its angular position. The actuator 11 is controlled by an output of a temperature control device (not shown) to vary the angular position of the air mix door 10. Any desired type of actuator 11 is usable such as one operated by vacuum or electromagnetic force.

A blower 12 sucks outside air or recirculated air through an inlet 13 or 14 selected by an outside air/recirculated air selector door 15 and delivers it to the evaporator 1. The blower 12 is operated by the control circuit 5 to revolve at a speed ranging from zero to maximum. The door 15 is also controlled by the control circuit 5 through an actuator 16.

The downstream end of the air conditioner has branch passages 17 and 18 which individually lead to upper and lower air outlets 17' and 18'. A mode door 19 is disposed in the branch conduit 17 and a mode door 20 in the branch conduit 18. The mode door 19 is controlled by the control circuit 5 through an actuator 22 and, likewise, the mode door 20 is controlled by the control circuit 5 through an actuator 23. The mode door 20 is movable between a first position where it blocks the passage 18, a second position where it directs air to a defrost outlet 21 and a third position where it passes air to the lower outlet 18'.

In a cooler mode, the door 19 will be opened and the door 20 closed. In a heater mode, the door 19 will be closed and the door 20 opened. In a bi-level mode, both of the doors 19 and 20 will be opened. Furthermore, in a defroster mode, the door 19 will be closed and the door 20 will assume the second position for supplying air to the defrost outlet 21.

In this way, the operation of the automotive air conditioner is controlled by output signals of the control circuit 5. Usually, the control circuit 5 selects an operating mode of the air conditioner, determines the amount of inlet air flowing through the system and permits the entry of recirculated or outside air in response to signals fed thereto from a mode selecting unit 27 operatively connected with a mode lever, an inlet air amount control unit and a recirculated/outside air selector switch (not shown).

In an automotive air conditioner of the type described, there is provided in accordance with the present invention a first sensor 24 responsive to fogging of the inner glass surfaces, a second sensor 25 responsive to the humidity inside the passenger compartment, a third sensor 26 responsive to the temperature outside the passenger compartment, and the control circuit 5 to which output signals of the sensors 24-26 are coupled. Additionally provided in the system is a humidifying means 28. Output signals of the control circuit 5 actuate the mode doors 19 and 20, compressor 3 and humidifier 28 so that the system avoids fogging of the inner glass surfaces while humidifying the passenger compartment.

In the illustrated embodiment, the sensor 24 comprises a humidity sensor mounted in intimate contact with the inner surface of a windowpane and designed to detect the possibility of fogging on the basis of the content of moisture in an air layer formed along the glass surface and the temperature of the glass surface. It should be born in mind, however, that the intimate contact of the sensor 24 with the glass inner surface is not essential. It may be located in any desired position as long as the selected position has correlation with fogging of inner surfaces, e.g. a position adjacent to an inner glass surface. Suppose that an output signal $R_{HG}$ of the humidity sensor 24 has a level $\alpha$ where there is no possibility of fogging against probable changes in ambient conditions such as a sharp change in the vehicle speed and a short period of rainfall (on the order of 80%-90% in terms of humidity for example), and that the signal level is $\beta$ where fogging is quite liable (on the order of more than 90% in terms of humidity for example). The second sensor 25 is responsive to the relative humidity inside the passenger compartment and may be mounted in a position adjacent to the instrument panel which is free from insulation. An output signal $R_{HR}$ of this sensor 25 has a lower limit value A (on the order of 20% in terms of humidity for example) and an upper limit value B (on the order of 40% in terms of humidity for example). When the signal $R_{HR}$ is lower than the lower limit A, the vehicle occupant will feel uncomfortable due to low humidity. When the signal $R_{HR}$ reaches the upper limit B, the occupant will be free from the uncomfortableness.

Figure 2:
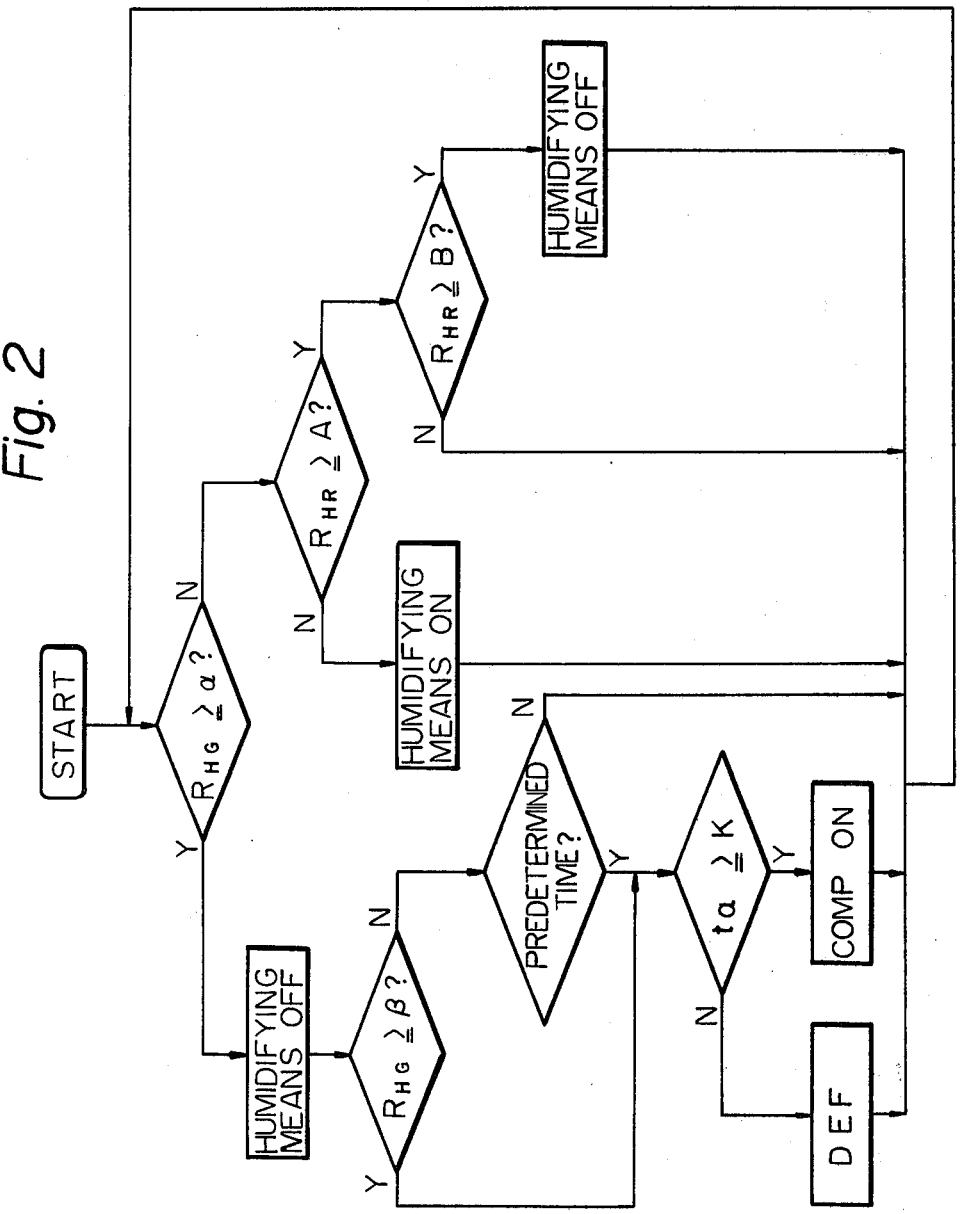
FIG. 2 is a flow chart demonstrating the operation of a control circuit associated with the air conditioner.

The anti-fogging and humidifying operation will proceed as indicated by the flow chart of FIG. 2. When the output signal $R_{HG}$ of the sensor 24 remains lower than the level $\alpha$, the humidity control inside the passenger compartment is permitted because fogging of the glass surfaces will not occur. If in this instance the output signal $R_{HR}$ of the sensor 25 is lower than the lower limit, the humidifying means 28 is activated to compensate for the low humidity. It will be noted here that the humidifying means implies not only a humidifier but introduction of humidifying outside air into the passenger compartment.

Where the humidifying means is the introduction of outside air, the actuator 16 for the selector door 15 will be supplied with an output signal from the control circuit 5. If the signal $R_{HR}$ is equal to or higher than the lower limit A but lower than the upper limit B, no actions take place because the occupant will not feel that the humidity is low within this range. If the signal $R_{HR}$ is equal to or higher than the upper limit B, humidification is unnecessary and, hence, the humidifying means 28 is turned off. If the signal $R_{HG}$ is equal to or higher than the level $\alpha$, the humidity control and humidification inside the passenger compartment are de-energized and the means 28 is turned off because fogging is liable to occur. Furthermore, if the signal $R_{HG}$ is equal to or higher than the level $\alpha$ but lower than the level $\beta$, whether the humidifying means 28 has just been turned off is determined because fogging may occur but has not occurred yet. Though the existing conditions will be maintained if the humidifying means 28 has just been turned off (e.g. for two minutes or less), some anti-fogging actions need be performed if a predetermined time such as two minutes has passed since the turn-off of the humidifying means 28. Thus, where the outside air temperature $t_a$ is higher than a given value K (e.g. 0° C.), the compressor 3 will be turned on to cause dehumidification with the evaporator 1. Where the temperature $t_a$ is lower than the reference level K, a defroster mode will be established because in this situation the compressor 3 is inoperable due to the inherent characteristic of a cooling cycle and because the air conditioner will then be operating in a heater mode in an ordinary sense. When the signal $R_{HG}$ is equal to or higher than the level $\beta$ needing a fogging preventive measure, the compressor 3 will be activated if the outside air temperature $t_a$ is equal to or higher than the reference level K while a defroster mode will be set up if the temperature $t_a$ is lower than the reference level K.

Figure 3:
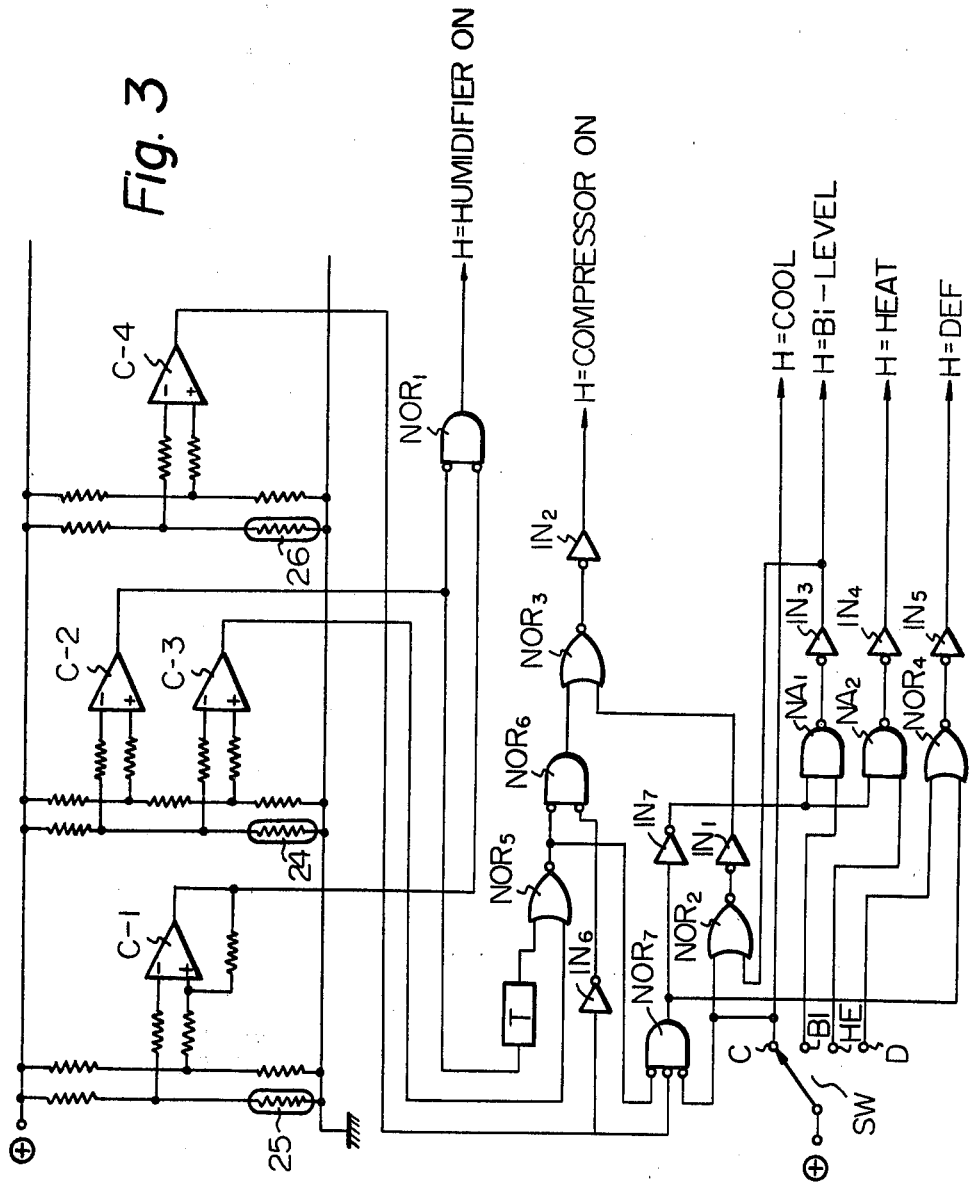
FIG. 3 is a diagram showing a part of the control circuit.
Figure 4A:
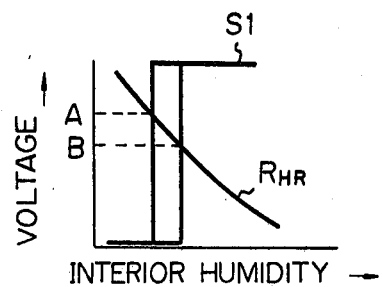
FIGS. 4a to 4c show various characteristics explanatory of the operation of the control circuit.
Figure 4B:
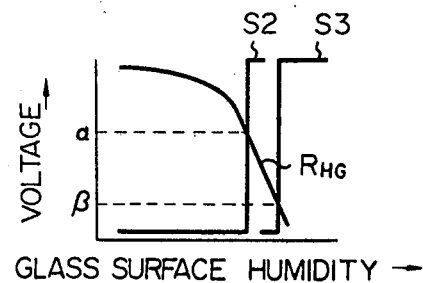
Figure 4C:
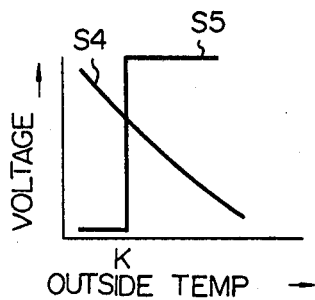

Referring to FIG. 3, a practical example of the control circuit 5 is shown. A comparator C-1 is adapted to compare an input voltage supplied from the inside humidity sensor 25 with a reference voltage. FIG. 4A shows the relationships between the input voltage $R_{HR}$ and output voltage S1 of the comparator C-1 and the humidity inside the passenger compartment. Comparators C-2 and C-3 compare an output voltage $V_{HG}$ of the glass humidity sensor 24 fed thereto with individual reference voltages. FIG. 4B indicates the relationships between the input voltage $V_{HG}$ and output voltages S2 and S3 of the comparators C-2 and C-3 and the humidity on the inner glass surfaces. A comparator C-4 compares an output voltage S4 of the outside air temperature sensor 26 with the reference voltage. FIG. 4C shows the relationships between the input voltage S4 and output voltage S5 of the comparator C-4 and the outside air temperature. If the signal $R_{HG}$ is lower than the level $\alpha$ making the output level of the comparator C-2 low or "L" and if the signal $R_{HR}$ is lower than the level A making the output level of the comparator C-1 also "L," turning on the humidifying means 28.

A switch SW constitutes the mode selector 27 and has four different positions C, BI, HE and D. In a cooler mode position C of the switch SW, its output signal moves the mode doors 19 and 20 to cooler mode positions through the individual actuators 22 and 23 and, at the same time, makes the output level of a NOR gate $NOR_2$ "L". Then the output level of an inverter $IN_1$ becomes "H", that of a NOR gate $NOR_3$ "L" and that of an inverter $IN_2$ "H" so that the electromagnetic clutch 4 is coupled to drive the compressor 3. In a bi-level mode position BI of the switch, a NAND gate $NA_1$ produces an "L" output which makes the output of an inverter $IN_3$ "H" and, hence, the actuators 22 and 23 shift the associated mode doors 19 and 20 to their bi-level mode positions. Additionally, the NOR gate $NOR_2$ produces an "L" output turning on the compressor 3 as in the cooler mode. In a heater mode position HE of the switch, the output of a NAND gate $NA_2$ becomes "L" and that of an inverter $IN_4$ "H" so that the actuators 22 and 23 move the mode doors 19 and 20 to the heater mode positions. In a defroster mode position D of the switch, a NOR gate $NOR_4$ produces an "L" output making the output level of an inverter $IN_5$ "H" and the actuators 22 and 23 therefore shift the mode doors 19 and 20 to defrosting mode positions.

As the signal $R_{HR}$ becomes equal to or higher than the level B causing the comparator C-1 to produce an "H" output, the output of the NOR gate $NOR_1$ becomes "L" to deactivate the humidifying means 28. The humidifying means 28 will also be turned off if the signal $R_{HG}$ is equal to or higher than the level $\alpha$ because, under this condition, the output of the comparator C-2 is "H" and that of the NOR gate $NOR_1$ is "L".

When the signal $R_{HG}$ is equal to or higher than $\alpha$ but lower than $\beta$ making the output of the comparator "H," a timer T is triggered. If the output level of the comparator C-2 remains "H" even after the lapse of a predetermined period of time, the output of the timer T becomes "H" and that of a NOR gate $NOR_5$ "L". If in this instance the temperature $t_a$ is equal to or higher than the reference level K with the output of the comparator C-4 thus made "H," the output of an inverter $IN_6$ is "L", that of a NOR gate $NOR_6$ "H", that of the NOR gate $NOR_3$ "L" and that of the inverter $IN_2$ "H" whereby the compressor 3 is activated to dehumidify the air inside the passenger compartment. If however the temperature $t_a$ is lower than the reference level K rendering the output of the comparator C-4 "L" and the air conditioner is not in the cooler mode, a NOR gate $NOR_7$ produces an "H" output which makes the output of an inverter $IN_7$ "L" while the NOR gate $NOR_4$ produces an "L" output which makes the output of the inverter $IN_5$ "H". The air conditioner will then operate in a defroster mode. The operation of the air conditioner discussed in relation with the "H" output of the timer T will also occur when the signal $R_{HG}$ becomes equal to or higher than $\beta$ and makes the output level of the comparator C-3 "H".

In this way, prevention of fogging and humidity control inside the vehicle cabin are performed automatically according to output signals of the fogging sensor 24, outside air temperature sensor 26 and compartment interior humidity sensor 25. Stated another way, the humidifying means 28 is controlled to maintain adequate humidity within the passenger compartment while fogging of windshield, rear window glass and others is avoided.

Figure 5:
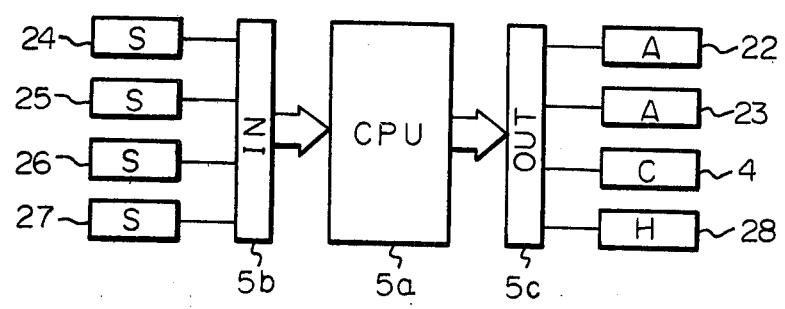
FIG. 5 is a block diagram of a microcomputer of which the control circuit may consist.

If desired, the fogging sensor 24 may be responsive to fogging or dewing on inner glass surfaces or to the temperature of inner glass surfaces and absolute humidity inside the vehicle cabin. As shown in FIG. 5, the control circuit 5 may comprise a microcomputer made up of a microprocessor 5a, input unit 5b and output unit 5c. In this case, the operating flow discussed will be stored in the microprocessor 5a and a predetermined processing will be performed according to input information to activate selected units on the basis of the flow stored in the microprocessor.

In summary, the present invention automatically controls the humidity inside a vehicle cabin while automatically preventing inner glass surfaces from becoming fogged and, thus, frees an operator from troublesome and sometimes dangerous manual operations of such controls.

Various modifications will become possible for those skilled in the art after receiving the teachings of the present disclosure without departing from the scope thereof.

What is claimed is:

1. A vehicle interior humidity control apparatus including interior humidity sensor means for sensing an interior humidity, window interior surface humidity sensor means for sensing a window interior surface humidity and interior humidifying means, characterized by comprising:

system control means responsive to outputs of the interior humidity sensor means and inner surface humidity sensor means for controlling the humidifying means in such a manner that when the inner surface humidity is below a first predetermined value the humidifying means is operated to increase the interior humidity to within a predetermined range and when the inner surface humidity is above the first predetermined value the humidifying means is de-energized;

the humidifying means being energized when the interior humidity drops below the predetermined range and de-energized when the interior humidity rises above the predetermined range; and interior air control means, the system control means controlling the air control means in such a manner that when the inner surface humidity is above a second predetermined value which is higher than the first predetermined value the air control means is operated to decrease the interior humidity.

2. An apparatus as in claim 1, in which the air control means is further operated to decrease the interior humidity when a predetermined length of time elapsed after the humidifying means is de-energized and the inner surface humidity is still above the second predetermined value.

3. An apparatus as in claim 1, in which the air control means comprises a defroster means and cooler means, the apparatus further comprising outside air temperature sensor means for sensing an outside air temperature, the system control means being responsive to an output of the temperature sensor means for operating the air control means in such a manner that when the outside air temperature is above a predetermined temperature value the cooler means is energized and when the outside air temperature is below the predetermined temperature value the defroster means is energized.

* * * * *